United States Patent
Maizels et al.

(10) Patent No.: US 9,740,298 B2
(45) Date of Patent: *Aug. 22, 2017

(54) ADAPTIVE PROJECTOR FOR PROJECTING CONTENT INTO A THREE-DIMENSIONAL VIRTUAL SPACE

(71) Applicant: APPLE INC., Cupertino, CA (US)

(72) Inventors: Aviad Maizels, Ramat Hasharon (IL); Alexander Shpunt, Portola Valley, CA (US); Tamir Berliner, Beit Hashmonay (IL)

(73) Assignee: APPLE INC., Cupertino, CA (US)

( * ) Notice: Subject to any disclaimer, the term of this patent is extended or adjusted under 35 U.S.C. 154(b) by 60 days.

This patent is subject to a terminal disclaimer.

(21) Appl. No.: 14/922,222

(22) Filed: Oct. 26, 2015

(65) Prior Publication Data

US 2016/0041625 A1 Feb. 11, 2016

Related U.S. Application Data

(63) Continuation of application No. 13/726,129, filed on Dec. 23, 2012, now Pat. No. 9,201,501, which is a
(Continued)

(51) Int. Cl.
*G06F 3/01* (2006.01)
*G06T 19/00* (2011.01)
(Continued)

(52) U.S. Cl.
CPC ......... *G06F 3/017* (2013.01); *G02B 27/0093* (2013.01); *G02B 27/0172* (2013.01); *G06F 3/011* (2013.01); *G06F 3/013* (2013.01); *G06K 9/00201* (2013.01); *G06K 9/00671* (2013.01); *G06T 19/006* (2013.01);
(Continued)

(58) Field of Classification Search
CPC .......... G06F 3/017; G06F 3/013; G06F 3/011; G06K 9/00671; G06K 9/00201; H04N 13/0484; H04N 13/044; H04N 13/0468; H04N 13/0055; G06T 19/006;
(Continued)

(56) References Cited

U.S. PATENT DOCUMENTS

| 9,158,375 B2 * | 10/2015 | Maizels | G06T 19/006 |
| 2003/0142068 A1 * | 7/2003 | DeLuca | G02B 27/22 345/156 |

(Continued)

*Primary Examiner* — Maurice L McDowell, Jr.
(74) *Attorney, Agent, or Firm* — D.Kligler IP Services Ltd.

(57) ABSTRACT

Embodiments of the invention provide apparatus and methods for interactive reality augmentation, including a 2-dimensional camera and a 3-dimensional camera, associated depth projector and content projector, and a processor linked to the 3-dimensional camera and the 2-dimensional camera. A depth map of the scene is produced using an output of the 3-dimensional camera, and coordinated with a 2-dimensional image captured by the 2-dimensional camera to identify a 3-dimensional object in the scene that meets predetermined criteria for projection of images thereon. The content projector projects a content image onto the 3-dimensional object responsively to instructions of the processor, which can be mediated by automatic recognition of user gestures.

18 Claims, 7 Drawing Sheets

Related U.S. Application Data continuation-in-part of application No. PCT/IB2011/053192, filed on Jul. 18, 2011.

(60) Provisional application No. 61/365,788, filed on Jul. 20, 2010.

(51) Int. Cl.
*H04N 13/00* (2006.01)
*H04N 13/04* (2006.01)
*G02B 27/00* (2006.01)
*G02B 27/01* (2006.01)
*G06K 9/00* (2006.01)

(52) U.S. Cl.
CPC ....... *H04N 13/0055* (2013.01); *H04N 13/044* (2013.01); *H04N 13/0468* (2013.01); *H04N 13/0484* (2013.01); *G02B 2027/014* (2013.01); *G02B 2027/0134* (2013.01); *G02B 2027/0138* (2013.01); *G02B 2027/0178* (2013.01); *H04N 13/0459* (2013.01)

(58) Field of Classification Search
CPC .......... G02B 2027/014; G02B 2027/01; G02B 27/0172; G02B 27/0093
See application file for complete search history.

(56) References Cited

U.S. PATENT DOCUMENTS

| | | | |
|---|---|---|---|
| 2005/0254726 A1* | 11/2005 | Fuchs | H04N 5/74 382/285 |
| 2009/0290758 A1* | 11/2009 | Ng-Thow-Hing | G06T 7/536 382/106 |
| 2011/0102763 A1* | 5/2011 | Brown | G01S 7/481 356/4.01 |

\* cited by examiner

ADAPTIVE PROJECTOR FOR PROJECTING CONTENT INTO A THREE-DIMENSIONAL VIRTUAL SPACE

CROSS-REFERENCE TO RELATED APPLICATIONS

This application is a continuation of U.S. patent application Ser. No. 13/726,129, filed Dec. 23, 2012, which is a continuation-in-part of PCT Patent Application PCT/IB2011/053192, filed Jul. 18, 2011, which claims the benefit of U.S. Provisional Application No. 61/365,788, filed Jul. 20, 2010, which is incorporated herein by reference.

BACKGROUND OF THE INVENTION

1. Field of the Invention

This invention relates generally to natural interaction systems. More particularly this invention relates to adaptive reality augmentation and 3-dimensional input interfaces.

2. Description of the Related Art

Natural user interfaces are gaining momentum in the entertainment and computer industry. Gesture controls are supplementing or replacing more conventional and less natural interfaces such as keyboard and mouse, game controller, and remote control. The user interactions, however, continue to relate largely to the computer monitor, thus limiting applicability and ease of use of such interfaces. Some of the gesture controls rely on optical 3-dimensional mapping.

Various methods are known in the art for optical 3-D mapping, i.e., generating a 3-dimensional profile of the surface of an object by processing an optical image of the object. This sort of profile is also referred to as a depth map or depth image, and 3-D mapping is also referred to as depth mapping.

Some methods are based on projecting a laser speckle pattern onto the object, and then analyzing an image of the pattern on the object. For example, PCT International Publication WO 2007/043036, whose disclosure is incorporated herein by reference, describes a system and method for object reconstruction in which a coherent light source and a generator of a random speckle pattern project onto the object a coherent random speckle pattern. An imaging unit detects the light response of the illuminated region and generates image data. Shifts of the pattern in the image of the object relative to a reference image of the pattern are used in real time reconstruction of a 3-D map of the object. Further methods for 3-D mapping using speckle patterns are described, for example, in PCT International Publication WO 2007/105205, whose disclosure is incorporated herein by reference.

SUMMARY

The present invention, in certain embodiments thereof seeks to provide an improved content projection device, which is aware of objects in its field of view, recognizing such objects as suitable for projection of content thereon. The projection device may adapt to the geometry and character of the objects by controlling scale, distortion, focus of the projected content, and varying the projected content itself. Additionally or alternatively, the projection device may adapt the projected content according to the relationship of the viewer to the projected content, such as its gaze vector, distance from the surface onto which content is projected, and other similar parameters. The 2D/3D input device used to analyze the geometry for projection can also be used to interact with the projected content.

According to disclosed embodiments of the invention, methods and apparatus are provided for the projection of content, such as the input device interface, using a 3-dimensional input device as means of determining the optimal objects to serve as substrate for such content projection.

There is provided according to embodiments of the invention an apparatus for processing data, including a sensing element for acquiring a scene including a 2-dimensional camera and a 3-dimensional camera, a processor linked to the 3-dimensional camera and the 2-dimensional camera and programmed to produce a depth map of the scene using an output of the 3-dimensional camera, and to coordinate the depth map with a 2-dimensional image captured by the 2-dimensional camera to identify a 3-dimensional object in the scene that meets predetermined criteria for projection of images thereon, and a content projector for establishing a projected image onto the 3-dimensional object responsively to instructions of the processor.

According to an aspect of the apparatus, coordinating the depth map includes identifying a position of the 3-dimensional object with six degrees of freedom with respect to a reference system of coordinates, wherein the content projector is operative to compensate for scale, pitch, yaw and angular rotation of the 3-dimensional object.

According to a further aspect of the apparatus, coordinating the depth map includes referencing a database of 3-dimensional object definitions and comparing the 3-dimensional object with the definitions in the database.

An aspect of the apparatus includes a wearable monitor, wherein the content projector is operative to establish the projected image as a virtual image in the wearable monitor or in a virtual space. The sensing element, the processor and the content projector may be incorporated in the wearable monitor.

According to a further aspect of the apparatus, the content projector is operative to establish the projected image onto a virtual surface for user interaction therewith.

According to yet another aspect of the apparatus, the processor is operative for controlling a computer application responsively to a gesture and wherein the projected image includes a user interface for control of the computer application.

According to aspect of the apparatus, the projected image includes written content.

In another embodiment, an apparatus for processing data includes a projector, which is configured to project content onto at least a part of a scene, and a processor, which is configured to detect a location of an eye of a person in the scene and to control the projector so as to reduce an intensity of the projected content in an area of the eye.

Other embodiments of the invention provide methods for carrying out the function of the above-described apparatus.

BRIEF DESCRIPTION OF THE SEVERAL VIEWS OF THE DRAWINGS

For a better understanding of the present invention, reference is made to the detailed description of the invention, by way of example, which is to be read in conjunction with the following drawings, wherein like elements are given like reference numerals, and wherein.

DETAILED DESCRIPTION

In the following description, numerous specific details are set forth in order to provide a thorough understanding of the various principles of the present invention. It will be apparent to one skilled in the art, however, that not all these details are necessarily always needed for practicing the present invention. In this instance, well-known circuits, control logic, and the details of computer program instructions for conventional algorithms and processes have not been shown in detail in order not to obscure the general concepts unnecessarily.

As used herein, the term "content projection" may encompass establishment of an image of the content onto a wearable transparent monitor, such as see-through eyeglasses, and thus invisible to anyone other than the person wearing the glasses, or onto a physical object that is visible to anyone interacting with the object. The term is not limited to the above examples. It may encompass forming an image by many means, including retinal projection, projection onto see-through glasses, projection of the image into a virtual space, for example as a hologram, and other techniques for creating augmented reality.

System Architecture.

Figure 1:
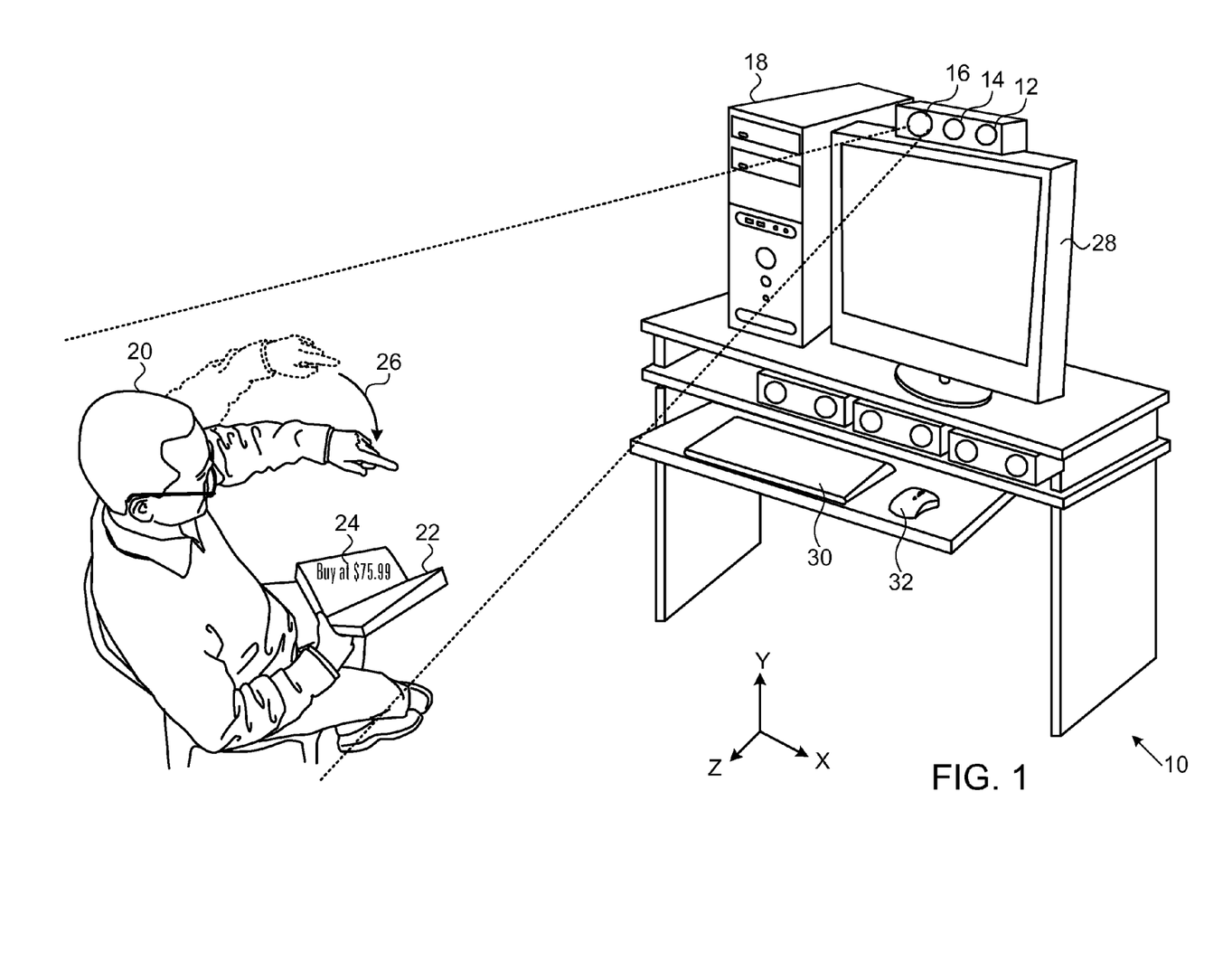
FIG. 1 is a schematic pictorial illustration of an interactive three-dimensional video display system, which is constructed and operative in accordance with a disclosed embodiment of the invention.

Turning now to the drawings, reference is initially made to FIG. 1, which is a schematic pictorial illustration of an interactive three-dimensional video display system 10, which is constructed and operative in accordance with a disclosed embodiment of the invention. The system 10 incorporates a 3-dimensional (3-D) camera 12, which may include an infra-red (IR) projector and corresponding CMOS/CCD camera open for the projector band. The terms "3-dimensional camera" and "3-D camera," as used herein, refer to an imaging device used in forming a 3-D map (also referred to as a depth map) of a scene, i.e., an array of 3D coordinates, comprising a depth (Z) coordinate value of the body surface at each point (X,Y) within a predefined area. The 3-D camera 12 captures 3-D information that may include the body (or at least parts of the body) of the user, tangible entities wielded or operated by the user for controlling a computer application, and other objects in the field of view of the 3-D camera 12. Details of a 3-D imaging assembly of this sort are described, for example, in PCT International Publication WO 2010/004542 and U.S. Patent Application Publication No. 2009/0183125, which are herein incorporated by reference. The 3-D camera 12 typically operates in the near infra-red spectrum. However the principles of the invention are equally applicable to modifications that enable the 3-D camera 12 to capture electromagnetic energy outside the near infra-red spectrum, for example far infrared or ultraviolet energy. The system 10 may also include a 2-dimensional (2-D) camera 14, which operates in the visible spectrum, and can acquire a scene with sufficient resolution to allow automatic interpretation of written information in the scene and typically produces a Red-Green-Blue (RGB) output signal.

The 3-D camera 12 and the 2-D camera 14 are cooperative with a content projector 16, all under the control of a processor, such as a computer 18.

A suitable unit for use in the system 10 that bundles the 3-D camera 12 and the 2-D camera 14 is the PrimeSensor™ Reference Design, available from PrimeSense Corporation, 104 Cambay Ct, Cary N.C., 27513, U.S.A. The content projector 16 may be the PicoP® display engine, available from MicroVision, Inc., 6222 185th Ave NE Redmond Wash., 98052. In some embodiments, the 3-D camera 12 and the 2-D camera 14 may be integral with the content projector 16 as a modification of the PrimeSensor Reference Design. In one embodiment, the 3-D camera 12 is an integrated module that includes an IR projector, which projects a pattern of spots onto the object and captures an image of the projected pattern. Alternatively, the IR projector, may be embodied as a separate module (not shown). The IR projector may be realized according to the teachings of U.S. Provisional Applications 61/372,729 (filed Aug. 11, 2010) and 61/425,788 (filed Dec. 22, 2010), as well as in PCT International Publication WO 2010/020380, all of which are herein incorporated by reference. These provisional and PCT applications also teach how to reuse the scanning hardware to project both the IR required for depth mapping and the visible content.

The processor may analyze the scene using the teachings of commonly assigned copending U.S. Patent Application Publication 2011/0293137, entitled "Analysis of Three-Dimensional Scenes", which is herein incorporated by reference.

The computer 18 may comprise a general-purpose computer processor, which is programmed in software to carry out the functions described hereinbelow. The software may be downloaded to the processor in electronic form, over a network, for example, or it may alternatively be provided on non-transitory tangible storage media, such as optical, magnetic, or electronic memory media. Alternatively or additionally, some or all of the image functions may be implemented in dedicated hardware, such as a custom or semi-custom integrated circuit or a programmable digital signal processor (DSP). Although the computer 18 is shown in FIG. 1, by way of example, as a separate unit from the 3-D camera 12, some or all of the processing functions of the computer may be performed by suitable dedicated circuitry associated with or within the housing of the 3-D camera 12 and the 2-D camera 14. As will be seen from the discussion below, elements of the system 10 may be miniaturized and incorporated in a wearable monitor to enable the user to move about and more freely interact with the scene in near real-time. In any case the 3-D camera 12 and the 2-D camera 14 function as a sensor component, which observes a scene (users and their surroundings). The computer 18 functions as a perception component, which comprehends the scene and user interaction within these surroundings as mediated or stimulated by information provided by the content projector 16.

The computer 18 may execute programs such as Nite™ Middleware, available from PrimeSense, in cooperation with the PrimeSensor Reference Design. For example, the PrimeSensor Reference Design supplies an application layer in the computer 18 with control widgets, thereby providing an application programming interface (API) that translates user gestures or postures into known deterministic application inputs. The Middleware performs image processing operations on data generated by the components of the system 10, including the 3-D camera 12 with its IR projector, and the 2-D camera 14 in order to reconstruct 3-dimensional maps of a user 20 and acquired scenes. The term "3-dimensional map" refers to a set of 3-dimensional coordinates representing the surface of a given object. One form of 3-dimensional map is referred to as a depth image or depth map, in which each pixel has a value indicating the distance from the camera to the corresponding point in the scene, rather than the brightness and color of the point as in a 2-dimensional image. The computer 18 then computes the three-dimensional coordinates of points on the surface of the control entity by triangulation, based on transverse shifts of the spots in the pattern.

In typical applications, information captured by the 3-D camera 12 is processed by the computer 18, which drives the content projector 16. The computer 18 may operate according to a program that is designed to create a natural or contrived experience for the user. As shown in FIG. 1, the system 10 has recognized a book 22 in the scene, and has projected a sale offer 24 onto the book 22: "Buy at $75.99". The user 20 is reacting to the offer by a hand gesture 26, which acts as an input to the computer 18. Gesture control of a computing device is known, for example, from commonly assigned U.S. Patent Application Publication No. 2009/0183125, which is herein incorporated by reference, and which also teaches methods of projection of scenes into a virtual image space. Gesture control is included in the functionality of the Nite™ Middleware, which may interpret gestures of the user 20, for example in response to the sale offer 24 that are acquired by the 3-D camera 12 and the 2-D camera 14.

Furthermore, as the interaction of the user 20 with the book 22 and the sale offer 24 evolves, for example, by the user 20 grasping the book 22, a gaze identification module executing in the computer 18 may recognize that the user 20 is looking at the book 22. By processing the acquired 2-D images, the book title may be recognized and interpreted in the system 10. Then, computing optimal projection parameters, a book review may be projected onto the book 22. The user 20 could scroll and interact with the projected book review as if he were viewing it on a display screen. In this way, the system 10, cooperatively with the user 20, converts the book 22 in an ad hoc fashion into a virtual information screen for the benefit of the user a20.

The system 10 optionally includes a display screen 28 and conventional input devices such as a keyboard 30 and mouse 32, which may present a user interface for administrative use, e.g., system configuration, and for operational control of the system 10 by the user 20.

Figure 2:
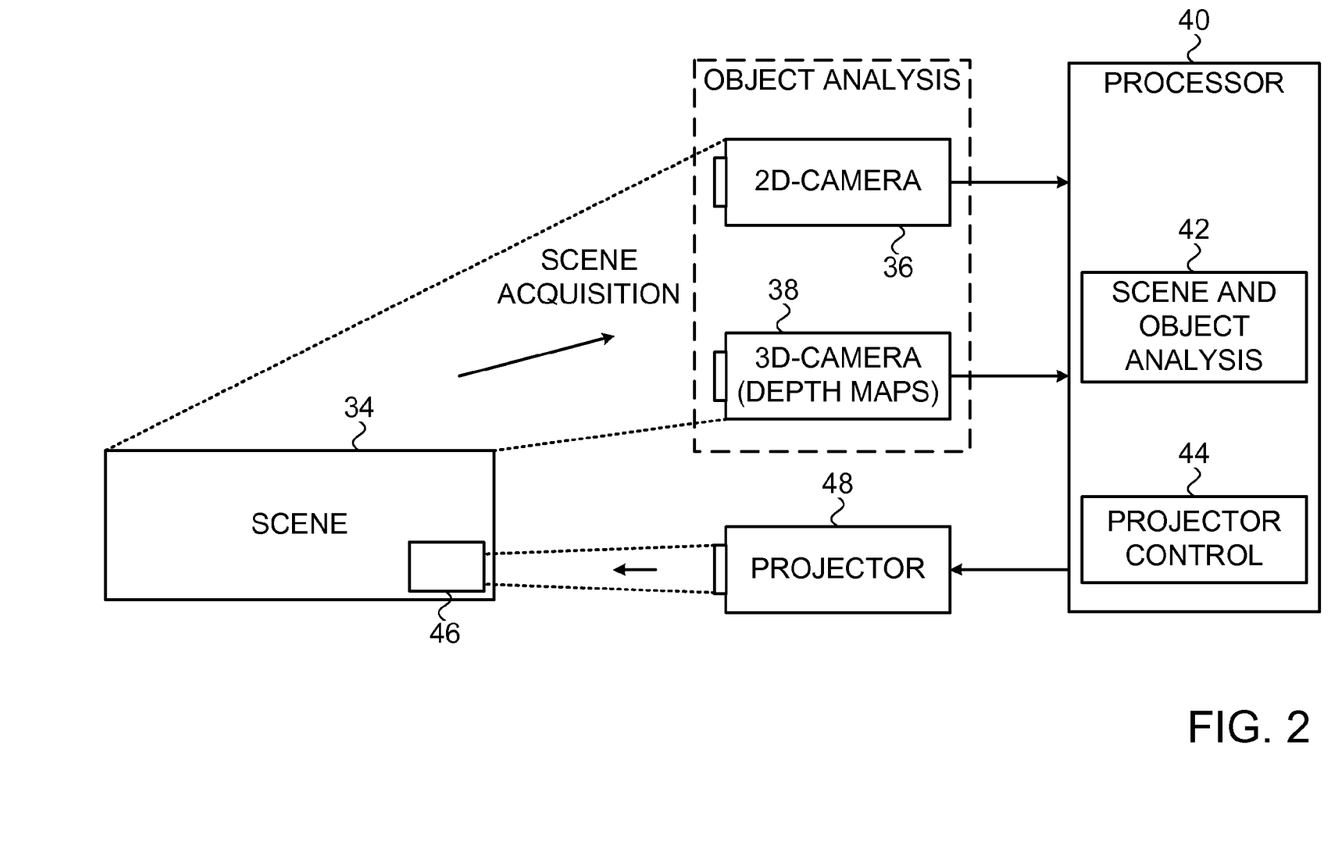
FIG. 2 is a block diagram of the system shown in FIG. 1, which is constructed and operative in accordance with an embodiment of the invention.

Reference is now made to FIG. 2, which is a block diagram of the system 10 (FIG. 1), in accordance with an embodiment of the invention. A scene 34 is acquired concurrently by two cameras, a 2-D camera 36 and a 3-D camera 38, which may be separate units or integral as a combined unit. Alternatively, the scene can be captured by the 3-D camera 38 only or by the 2-D camera 36 only, image analysis performed on the images acquired in any case. As noted above these cameras may be realized as the PrimeSensor Reference Design. Data output by the 2-D camera 36 and a 3-D camera 38 are input to a processor 40, which executes middleware, for example, the above-mentioned Nite Middleware. The Middleware places the scenes captured by the two cameras in registration. The middleware includes an object analysis module 42, which identifies objects in the scene 34 and determines their suitability for content projection thereon. A projector control module 44, another component of the Middleware, converts coordinates and characteristics of objects in the scene 34, for example an object 46, and prepares an image for projection. The module 44 issues suitable instructions for a projector 48 such that the image, typically containing information content, is projected onto the object 46. The instructions may contain corrections for distortion attributable to the scale, attitude and configuration of the object 46. Additionally or alternatively, the projector 48 may include its own mechanisms to compensate for such distortion.

The position and attitude of the user may be taken into consideration when computing projection parameters. For example, as noted above, the gaze vector toward the projected content may vary as the user moves about in the scene. The projection parameters may be accordingly adjusted to compensate for such variations, e.g., by adjusting for scale, parallax, and similar distortions, so as to simulate a realistic experience for the user. One example of such adjustment is a correction for the fact that 3-dimensional objects appear differently when viewed from different directions, i.e., different sides of the object or different 2-D projections of the object become apparent to the observer. The projection content can be adjusted as a function of the gaze vector and user position relative to virtual object, thus creating a realistic experience of the object actually being in the presence of the observer. Gaze direction can be determined by methods known in art. For example, in the case of a device embedded in see-through glasses, head position orientation is obtainable by rigid registration of the world relative to the device. Gaze direction can also be measured, for example, using eye-tracking products available from Tobii Technology, Inc., 510 N, Washington Street, Suite 200, Falls Church, Va. 22046. Gaze may then be translated into object coordinates using 3D information obtained by the sensor.

Object Awareness.

Techniques for identifying and tracking body parts are known from commonly assigned U.S. Patent Application Publication No. 2011/0052006, entitled "Extraction of Skeletons from 3-D Maps", which is herein incorporated by reference. Essentially this is accomplished by receiving a temporal sequence of depth maps of a scene containing a humanoid form. A digital processor processes at least one of the depth maps so as to find a location of a designated body part, such as the head or hand estimates dimensions of the humanoid form based on the location. The processor tracks movements of the humanoid form over the sequence using the estimated dimensions. These teachings are employed in the above-mentioned Nite Middleware, and may be enhanced by linking other known recognition routines by those skilled in the art.

For example, in the case of identifying the head of the body, the processor may segment and analyzes a 3-dimensional form to identify right and left arms, and then search the space between the arms in order to find the head. Additionally or alternatively recognition techniques may be used. The depth maps may be registered with 2-dimensional images of the head or other object. The processor may apply a pattern or face recognition technique to identify the face of a humanoid form in a 2-dimensional image. The face location in the 2-dimensional image is then correlated with the location of the head of the 3-dimensional form. Using the same techniques, an entire scene may be analyzed, segmented, and known categories of objects identified as candidates for projection of images thereon.

Figure 7:
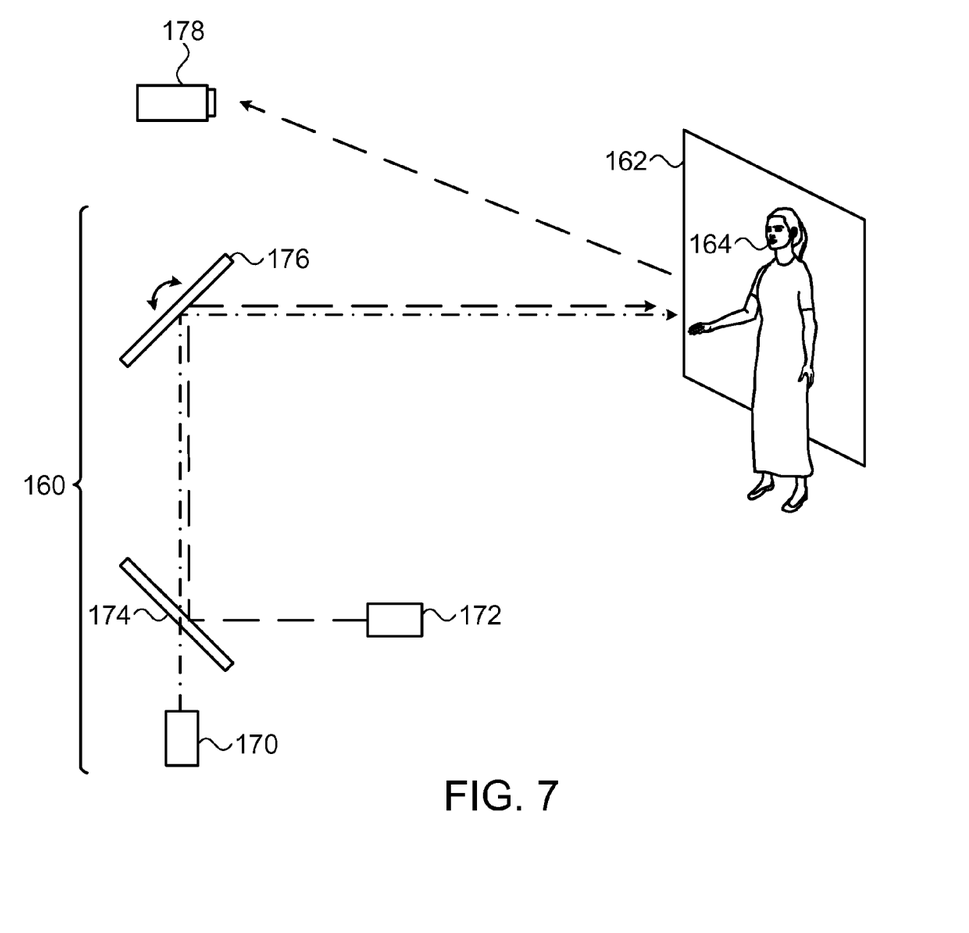
FIG. 7 is a schematic illustration of elements of an interactive projection system, in accordance with an alternative embodiment of the invention.

In one embodiment, which is shown in FIG. 7, upon recognizing the head in an area in which an image is being projected, the processor may instruct the projector to reduce the intensity of the light that is projected in the area of the head (or turn it off entirely) in order to avoid projecting bright light into the eyes, which can be uncomfortable and even hazardous.

Object Processor.

Figure 3:
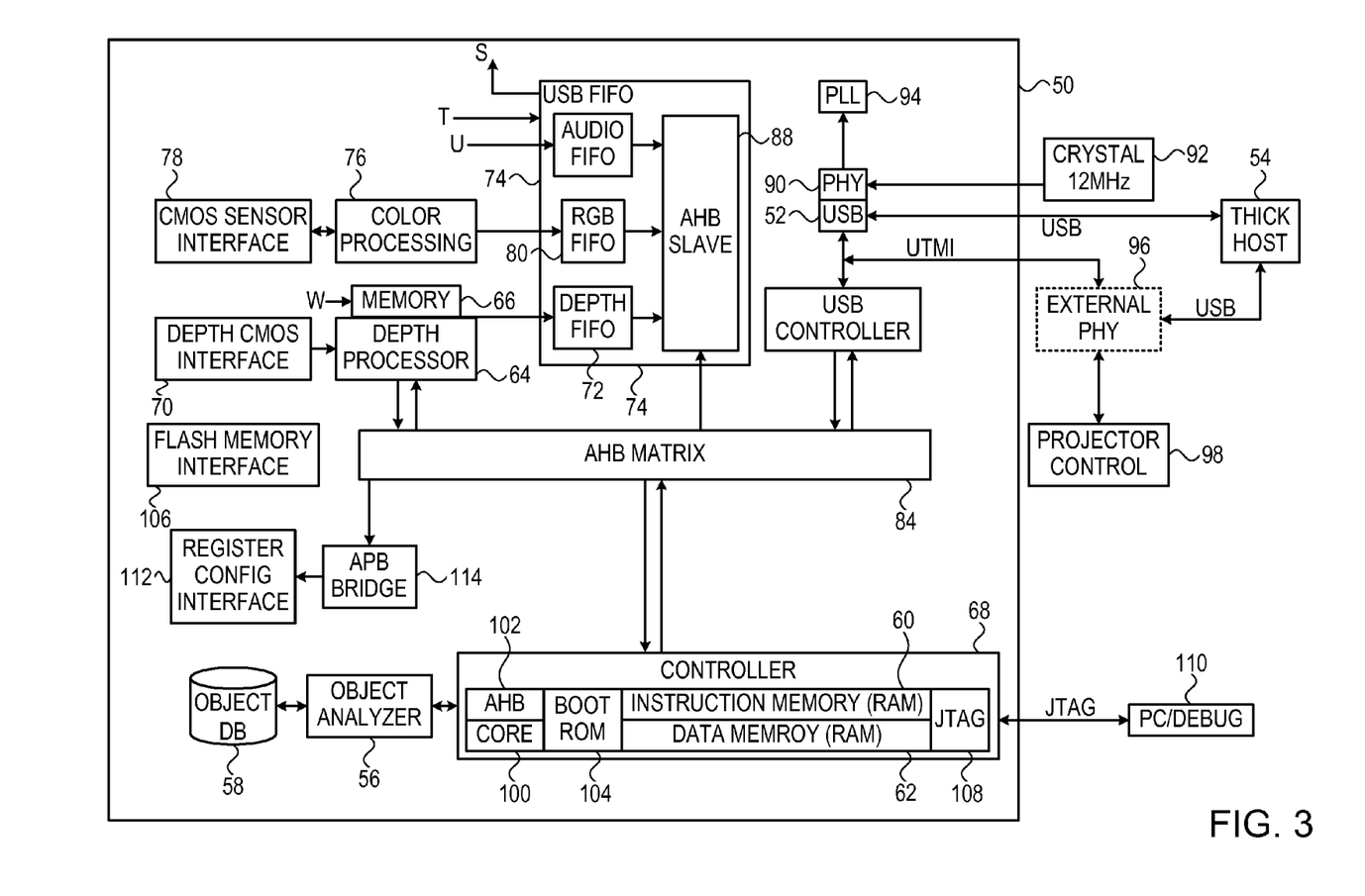
FIG. 3 is a block diagram that shows functional elements of a portion of an exemplary processing device, which is constructed and operative in accordance with an embodiment of the invention.

Reference is now made to FIG. 3, which is a block diagram that schematically shows functional elements of a portion of an exemplary processing device 50, which is a component of the processor 40 (FIG. 2), and which is constructed and operative in accordance with an embodiment of the invention. The processing device 50 may be fabricated as a dedicated integrated circuit, on a single semiconductor substrate, with a USB port 52 to an optional host computer 54. Device 50 may include other interfaces, as well, including an object analyzer 56. The object analyzer 56 is linked to a database 58, which holds a library containing descriptions of objects to be recognized and evaluated by the object analyzer 56. It will be appreciated that alternative configurations of the processing device 50 can be constructed by those skilled in the art. As noted above, the operations of the processing device 50 may be controlled by middleware residing in instruction memory 60 and data memory 62

A depth processor 64 processes the information captured by the 3-D camera 12 (FIG. 1) in order to generate a depth map. Depth processor 64 uses dedicated memory space in a memory 66. This memory can also be accessed by a controller 68, which is described hereinbelow, but typically not by the host computer 54. Rather, depth processor 64 may be programmed by the host computer 54 via an application program interface (API).

Depth processor 64 receives input IR data from 3-D camera 12 (FIG. 1) via a depth CMOS interface 70. The depth processor 64 processes the video data in order to generate successive depth maps, i.e., frames of depth data. The depth processor 64 loads these data into a depth first-in-first-out (FIFO) memory 72 in a USB FIFO unit 74.

In parallel with the depth input and processing operations, a color processing block 76 receives input color video data from the 2-D camera 14 (FIG. 1) via a color CMOS sensor interface 78. The block 76 converts the raw input data into output frames of RGB video data, and loads these data into a RGB FIFO memory 80 74 in the unit 74. Alternatively, the block 76 may output the video data in other formats, such as YUV or Bayer mosaic format.

The unit 74 acts as a buffer level between the various data suppliers and a USB controller 82. The unit 74 packs and formats the various data types according to different classes (such as a USB video class and a USB audio class), and also serves to prevent data loss due to USB bandwidth glitches. It arranges the data into USB packets according to the USB protocol and format prior to transferring them to the USB controller.

A high-bandwidth bus, such as an Advanced High-performance Bus (AHB) matrix 84, is used to carry data between the components of the processing device 50, and specifically for conveying data from the unit 74 to the USB controller 82 for transfer to the host computer 54. (AHB is a bus protocol promulgated by ARM Ltd., of Cambridge, England.) When there are packets ready in the unit 74 and space available in the internal memory of USB controller 82, the USB controller 82 uses direct memory access (DMA) to read data from memory 72, memory 80, and an audio FIFO memory 86 via an AHB slave module 88 and the matrix 84. The USB controller 82 multiplexes the color, depth and audio data into a single data stream for output via the USB port 52 to the host computer 54.

For the purpose of USB communications, they processing device 50 comprises a USB physical layer interface, PHY 90, which may be operated by the USB controller 82 to communicate via a suitable USB cable with a USB port of the host computer 54. The timing of the USB PHY is controlled by a crystal oscillator 92 and a phase-locked loop 94 (PLL), as is known in the art.

Alternatively, USB controller 86 may optionally communicate with the host computer via a USB 2.0 Transceiver Macrocell Interface (UTMI) and an external PHY 96.

Various external devices may connect with the processing device 50 cooperatively with the host computer 54, including a projector control module 98, which accepts instructions from the processing device 50 and the host computer 54 to effect a desired image projection onto specified coordinates in space.

The controller 68 is responsible for managing the functions of the processing device 50, including boot-up, self-test, configuration, power and interface management, and parameter adjustment.

The controller 68 may comprise a digital signal processor (DSP) core 100 and an AHB master 102 for controlling data movement on the matrix 84. Typically, controller 68 boots from a boot read-only memory 104, and then loads program code from a flash memory (not shown) via a flash memory interface 106 into instruction random-access memory 60 and data memory 62. The controller 68 may, in addition, have a test interface 108, such as a Joint Test Action Group (JTAG) interface, for purposes of debugging by an external computer 110.

The controller 68 distributes configuration data and parameters to other components of the processing device 50 via a register configuration interface 112, such as an Advanced Peripheral Bus (APB), to which the controller is connected through the matrix 84 and an APB bridge 114.

Further details of the processing device 50 are disclosed in the above-noted PCT International Publication WO 2010/004542.

Object Analysis.

Continuing to refer to FIG. 3, the object analyzer evaluates data developed by the depth processor 64 in cooperation with the block 76 and the unit 74 to evaluate a scene captured by the 3-D camera 12 (FIG. 1).

The algorithm executed by the object analyzer 56 may be dictated by an application program in the host computer 54. For example, the object analyzer 56 may be instructed to search for and report one or more known objects in the scene that are specified in the database 58. The host computer 54 may thereupon instruct the content projector 16 (FIG. 1) to project images on the selected object or objects. Additionally or alternatively, the object analyzer 56 may be instructed to identify and report objects meeting predefined criteria, without resort to the database 58.

The data communicated by the object analyzer 56 with respect to an identified object typically includes the size and location of the object, as well as its orientation, preferably with six degrees of freedom, including scale, pitch, yaw and angular rotation with respect to a reference system of coordinates. This information allows the projector to compensate for distortions by suitably scaling and contorting a projected image so as to be project it onto the selected object such that the viewer sees an image that is substantially distortion-free. Configuration of a projected image is known, e.g., from U.S. Patent Application Publication No. 20110081072, entitled "Image Processing Device, Image Processing Method, and Program". The image may be configured in software in order to avoid the expense of complex optical arrangements and to more easily achieve freedom from such effects as off-axis image distortion. Alternatively, as noted above, commercially available projects may provide their own compensation for distortion control.

Figure 4:
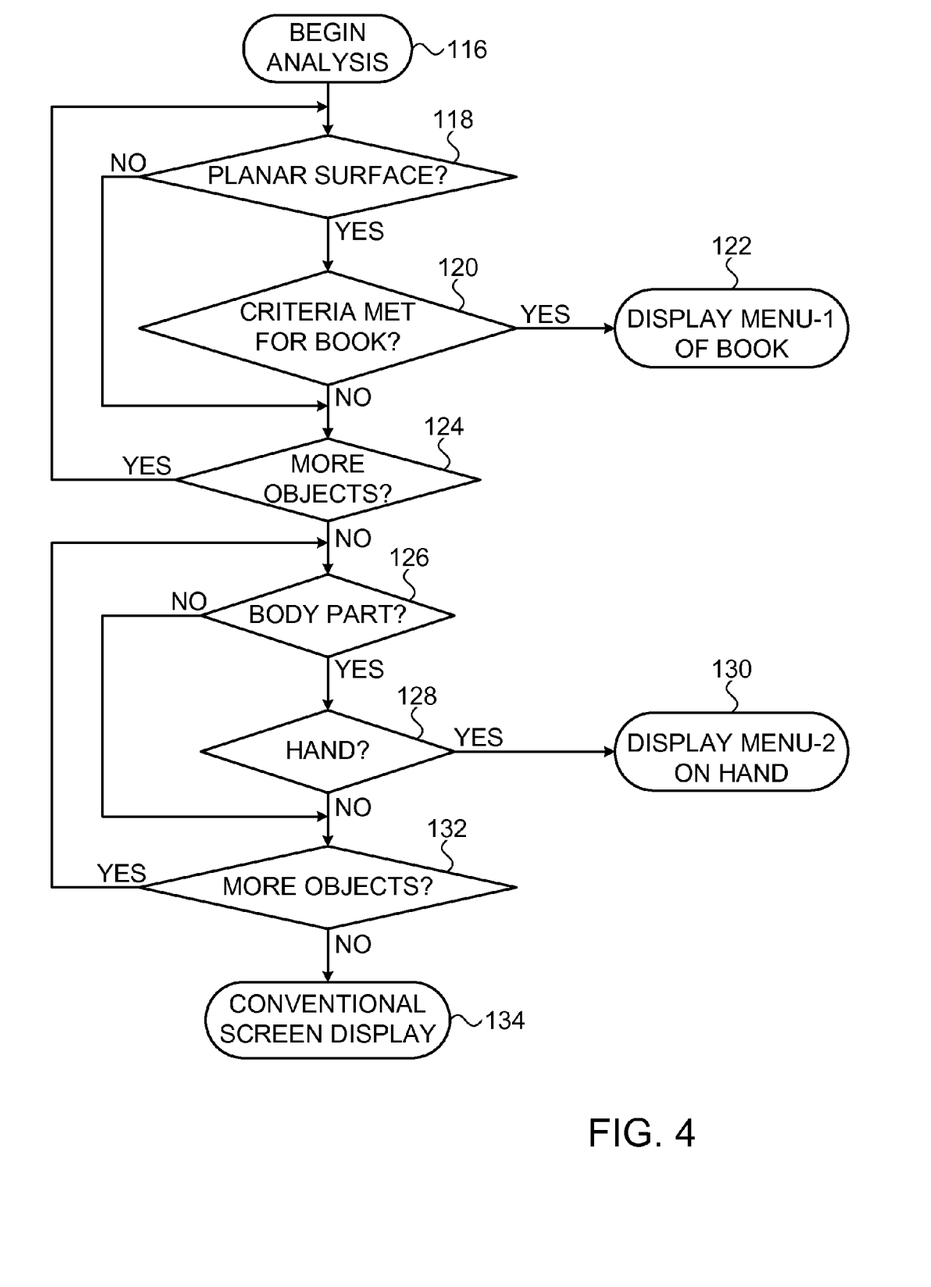
FIG. 4 is an exemplary flow chart of a method of identifying 3-dimensional objects in a scene in accordance with an embodiment of the invention.

Reference is now made to FIG. 4, which is an exemplary flow chart of a method of identifying 3-dimensional objects in a scene in accordance with an embodiment of the invention. For convenience of presentation, the method is disclosed in conjunction with the apparatus shown in FIG. 1 and FIG. 3, but it is applicable to apparatus configured differently. The process steps are shown in a particular linear sequence in FIG. 4 for clarity of presentation. However, it will be evident that many of them can be performed in parallel, asynchronously, or in different orders. Those skilled in the art will also appreciate that a process could alternatively be represented as a number of interrelated states or events, e.g., in a state diagram. Moreover, not all illustrated process steps may be required to implement the process. Furthermore, many details may vary according to the dictates of the host computer 54 and the requirements of its application program.

Assume that the viewer is located in a bookshop. At initial step 116 an application program executing in the host computer 54 would like to identify an open book displaying textual information. This is a 3-dimensional object having a known definition in the database 58 that includes at least one generally light-colored planar surface. The 3-D camera 12 is enabled and a 3-dimensional scene captured in the processing device 50. The object analyzer 56 evaluates the scene, locates and identifies objects in 3-dimensional space.

At decision step 118 it is determined whether a planar surface has been located in the scene.

Control now proceeds to decision step 120, where it is determined if the planar surface meets criteria for a book. The criteria may involve, inter alia, size, proximity to certain other objects, and geometric details corresponding to a closed or open book.

If the determination at decision step 120 is affirmative, then control proceeds to final step 122. The coordinates and orientation of the book are reported by the object analyzer 56 to the controller 68, which instructs the projector control module 98 cooperatively with the host computer 54 to display an application-determined image (MENU-1) on the identified book. The image may contain, for example, options to purchase the item, or obtain additional details, for example book reviews, and popularity ratings. Indeed, if the 3-D camera 12 was successful in capturing the title of the book, the additional details may be included in the projected image. It is assumed that the host computer 54 has access to a local or distributed database or can make automatic inquiries via the Internet.

The coordinates and other characteristics of the book (or of any other object onto which an image is to be projected) can also be used in controlling projection parameters such as the intensity of light projected in the image. Thus, for example, the projector may increase the intensity of the projected light when the object is relatively far from the projector and decrease it for nearby objects. Additionally or alternatively, the reflectivity of the object may be assessed (using image data from camera 36, for example), and the intensity of the projected light may be increased when projected onto less reflective objects and decreased for more reflective objects.

If the determination at decision step 120 is negative, then control proceeds to decision step 124. A determination is made if more objects are present in the scene for processing.

If the determination at decision step 124 is affirmative, then control returns to decision step 118.

If the determination at decision step 124 is negative, then a second state of the method commences. It is assumed that the application program falls through to a secondary option, in which an image is projected on the user's hand, if visible to the 3-D camera 12.

Control now proceeds to decision step 126, where it is determined if a body part is present in the scene. This may be accomplished using the teachings of the above-noted U.S. Patent Application Publication No. 2011/0052006.

If the determination at decision step 126 is affirmative, then control proceeds to decision step 128, where it is determined if the body part is a hand.

If the determination at decision step 128 is affirmative, then control proceeds to final step 130, which is similar to final step 122. However, a different menu (MENU-2) is now projected on the hand, which may include, for example, control options for the governing computer application. In both final step 122 and final step 130 the image is configured so as to create a natural feeling on the part of the user when interacting with the content.

Alternatively or additionally, the object analyzer may determine whether the body part in question is a head and if so, may instruct the projector to reduce or turn off the projected intensity in the area of the head. This option is described in greater detail hereinbelow with reference to FIG. 7.

If the determination at decision step 128 is negative, then control proceeds to decision step 132. A determination is made if more objects are present in the scene for processing.

If the determination at decision step 132 is affirmative, then control returns to decision step 126. Otherwise, control passes to final step 134, in which a conventional menu display is presented on a display screen. Final step 134 represents a failure to identify a suitable external object for projection of an image thereon. It will be appreciated that the method shown in FIG. 4 can be varied, and elaborated as required to comply with the specifications of the governing application program. Recognition and prioritization of various objects and images may be programmed so as to accommodate the configuration of a particular scene and the needs of the program itself.

Alternate Embodiment 1

Figure 5:
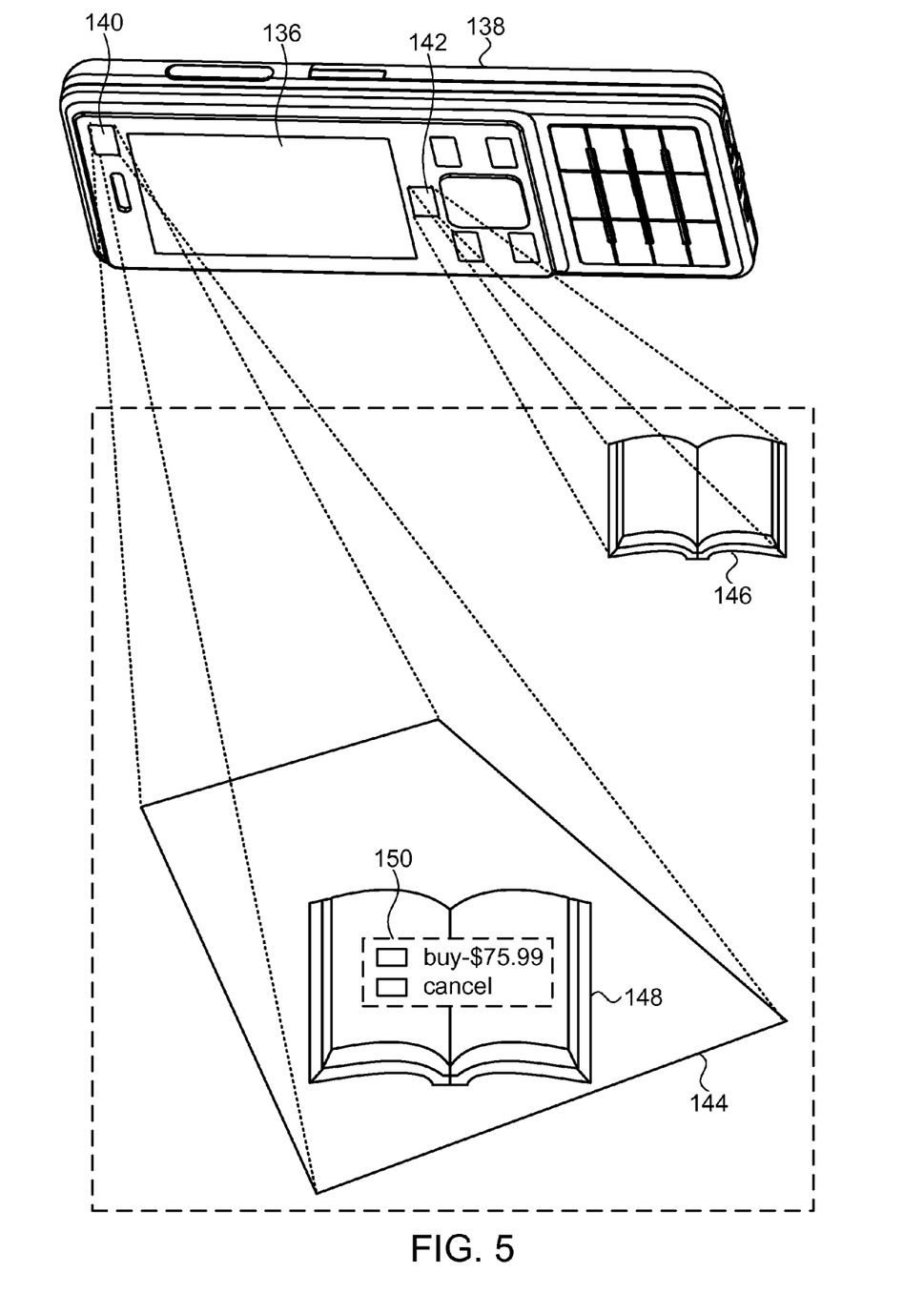
FIG. 5 illustrates a screen of a mobile device that is projected onto a virtual surface in accordance with an embodiment of the invention.

This embodiment is similar to the first embodiment, except a convenient virtual surface is provided for projection of images and for access by the user. Reference is now made to FIG. 5, which illustrates a screen 136, typically of a mobile information device 138, such as a cellular telephone, e.g., a "smart phone" that is projected onto a virtual surface in accordance with an embodiment of the invention. Such devices are too small for convenient interaction and media consumption. The screen 136 incorporates a miniature projector 140 and sensing device 142, which have the same functions as the 3-D camera 12 and content projector 16 in the embodiment of FIG. 1. Projectors suitable for this purpose are available, for example, from Microvision. In this embodiment, the projector 140 projects an image onto a virtual projection surface 144, which is enlarged relative to the screen 136.

In one mode of operation, the projector 140 may create an enlarged version of information displayed on the screen 136.

In another mode of operation the sensing device 142 captures an external scene. The mobile information device 138 is configured to perform the method of scene analysis described above with reference to FIG. 4. In this example, an open book 146 was identified in the external scene. An application program executing in the mobile information device 138 has caused the projector 140 to project an image 148 of the book 146 onto the projection surface 144, and to superimpose a menu 150 onto the image 148. The menu 150 invites the user to purchase the book 146 at a sales price of $75.99 or to cancel the display.

Alternate Embodiment 2

In the first embodiment, images have been described as projections onto a physical object, e.g., a book or a hand. In this embodiment, the projector may be embodied as a device that projects content onto a wearable monitor, such as eye-glasses. In this embodiment final step 122 and final step 130 are modified in the method of FIG. 4.

Figure 6:
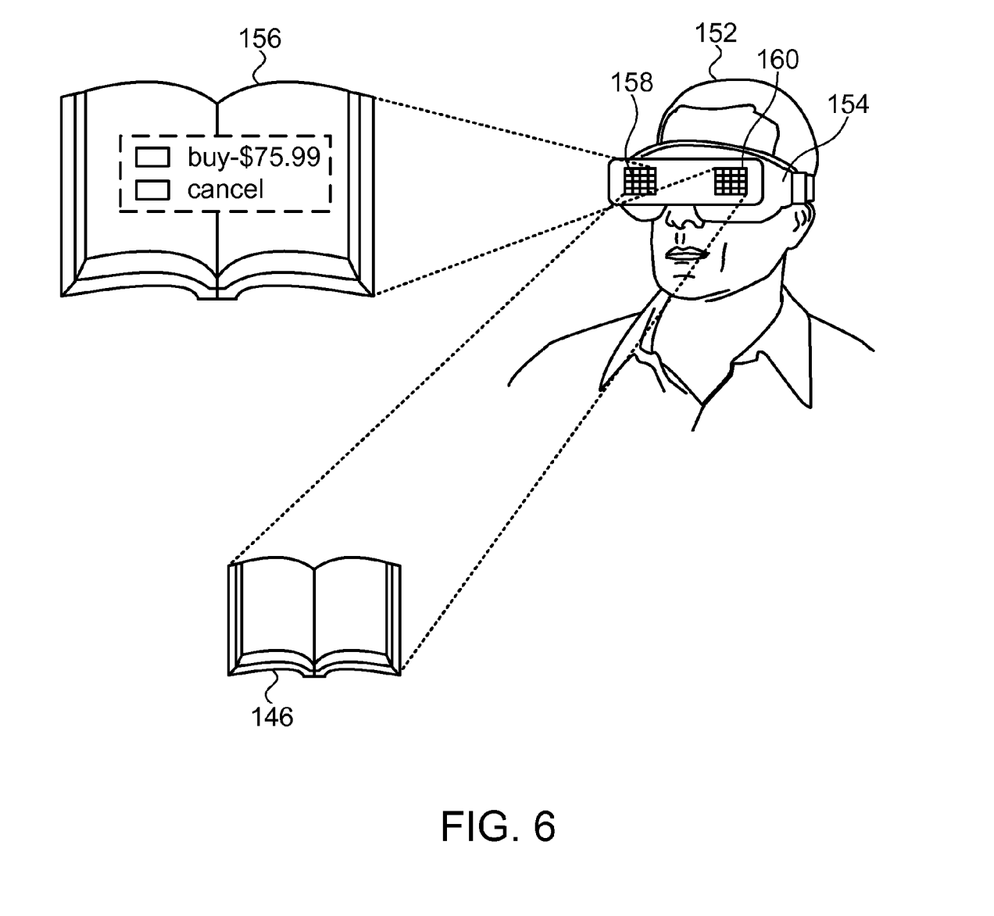
FIG. 6 illustrates an interactive three-dimensional video display system that includes a wearable monitor in accordance with an embodiment of the invention.

Reference is now made to FIG. 6, which illustrates an interactive three-dimensional video display system having a wearable monitor in accordance with an embodiment of the invention. The system is configured to project the respective images onto the wearable monitor rather than the object themselves Such devices offer possibilities of allowing a computer-generated image produced by the method described with reference to FIG. 4 to be generated and optionally superimposed on a real-world view. Such devices may operate by projecting the computer-generated image through a partially reflective mirror while viewing an external scene. Alternatively the device may mix the computer-generated image and real-world view electronically.

In the example of FIG. 6, a user 152 employs a wearable monitor 154, which is capable of displaying stereoscopic imagery. The wearable monitor 154 is provided with or interfaced with components similar to those of the system 10 (FIG. 1). Like the system 10, the wearable monitor 154 is adapted to analyze an external scene. In this example, it identifies the book 146, and generates an image 156 containing the same information as the image 148 (FIG. 5). The wearable monitor 154 may be a separate unit or may incorporate other elements of the system 10. In the embodiment of FIG. 6, the wearable monitor 154 includes a miniature projector 158 and a sensing element 160. Additionally or alternatively, the wearable monitor 154 may communicate with an external processor or sensing device via a wireless link. Suitable wearable helmet mounted displays and see-through eyewear displays for use as the wearable monitor 154 are available as the Madison line of Novero (novero.com) or from Lumus Ltd., 2 Bergman Street Rehovot 76705, Israel.

While the image 156 is actually established within the wearable monitor 154, in some embodiments it may be perceived by the user 152 as being superimposed in an external region of space as shown in FIG. 6. The wearable monitor 154 in such embodiments may be equipped with positioning, head-tracking and eye-tracking subsystems.

Alternate Embodiment 3

FIG. 7 is a schematic side view of a scanning projector 160 and associated components in a system for adaptive projection, in accordance with still another embodiment of the present invention. Projector 160 may be used in system 10 (FIG. 1), and offers enhanced capabilities in using the same scanning hardware to simultaneously project both an infrared (IR) pattern (for 3-D mapping) and visible content that can be viewed on a screen 162 or other surface. In this sort of embodiment, an image capture device, such as a camera 178 captures an image of the projected IR pattern, and this image is processed in order to create a 3D map of the scene containing screen 162 (which in this example contains a person 164). Based on the 3-D map, projector 160 may then project onto the scene a visible image that is tailored to the shape and contours of the objects in the scene, as noted above.

As shown in FIG. 7, a beam combiner 174, such as a dichroic reflector, aligns the IR beam from a radiation source 170 with a visible beam from a visible light source 172. Source 172 may be monochromatic or polychromatic. For example, source 172 may comprise a suitable laser diode or LED for monochromatic illumination, or it may comprise multiple laser diodes or LEDs of different colors (not shown), whose beams are modulated and combined in order to project the desired color at each point in the field of view. For this latter purpose, combiner 174 may comprise two or more dichroic elements (not shown) in order to align all of the different colored and IR beams.

A scanning mirror 176 (or a pair of scanning mirrors—not shown) scans the beams from sources 170 and 172, typically in a raster pattern, over the field of view of camera 178. While the beams are scanned, projector control 44 in processor 40 (FIG. 2) modulates sources 170 and 172 simultaneously: Source 170 is modulated to generate the desired pattern for 3-D mapping at each point in the field, while source 172 is modulated according to the pixel value (intensity and possibly color) of the visible image that is to be projected at the same point (which may be based on the 3-D map of the scene at that point). Because the visible and IR beams are optically aligned and coaxial, the visible image will be automatically registered with the 3-D map. Alternatively, in place of camera 178, projector 160 may also contain another sort of sensing element, such as an IR detector (not shown), whose field of view is scanned so as to coincide with the projection scan. Such detection schemes are described, for example, in the above-mentioned PCT International Publication WO 2010/020380. Additionally or alternatively, the projector may contain also contain a detector or detectors for visible light in order to form a color image of the scene.

The projector shown in FIG. 7 is particularly useful in adjusting the projected image to the characteristics of the scene, since it enables the projected pattern to be modified on the fly, pixel by pixel, in perfect registration with the 3-D map that provides the scene information. As a particular example, when the presence of person 164 is detected in the scene (by suitably segmenting and analyzing the 3-D map), the intensity of source 172 may be decreased, possibly to the point of turning off the source altogether, in the area of the person's head or at least in the area of the eyes. In this manner, projector 160 avoids shining bright light into the person's eyes, which could otherwise cause discomfort and even eye damage.

This principles of this embodiment may be applied using other types of imaging and projection devices and are not limited to the particular sort of scanning projector and mapping device that are described above. For example, other types of mapping and imaging devices, as well as other image analysis techniques, which may operate on either a 2-D image captured by a suitable capture device or a 3-D map, may be applied in identifying the area of the eyes for this purpose. Similarly, substantially any suitable type of electronically-driven projector (including standard video projectors) can be controlled in this manner to reduce intensity in the area of the eyes, as long as an image or map of the area onto which the projector casts its beam is registered in the frame of reference of the projector. Thus, when the location of the head and/or eyes that is found in the image or map, the corresponding part of the projected beam can be dimmed accordingly.

It will be appreciated by persons skilled in the art that the present invention is not limited to what has been particularly shown and described hereinabove. Rather, the scope of the present invention includes both combinations and sub-combinations of the various features described hereinabove, as well as variations and modifications thereof that are not in the prior art, which would occur to persons skilled in the art upon reading the foregoing description.

The invention claimed is:

1. An apparatus for processing data, comprising:
   a sensing element comprising a 3-dimensional camera for acquiring a scene;
   a 2-dimensional camera for acquiring a 2-dimensional image of the scene;
   a processor linked to the 3-dimensional camera and the 2-dimensional camera and programmed to produce a depth map of the scene using an output of the 3-dimensional camera, and making a scene analysis to identify a 3-dimensional object in the scene that meets predetermined criteria for projection of images thereon;
   a wearable monitor; and
   a content projector, which is configured to form an image on the wearable monitor responsively to instructions of the processor so that the image is superimposed on the 3-dimensional object in a 3-dimensional virtual space,
   wherein the processor is operative for recognizing information relating to the 3-dimensional object in the 2-dimensional image, and to apply the recognized information in the instructions to the content projector.

2. The apparatus according to claim 1, wherein the wearable monitor comprises see-through eyeglasses.

3. The apparatus according to claim 1, wherein the instructions of the processor are responsive to the scene analysis, and wherein the processor is cooperative with the content projector for varying at least one of projection parameters and content of the image responsively to the scene analysis.

4. The apparatus according to claim 3, wherein the at least one of the projection parameters comprises an intensity of light in the image, which is varied responsively to the scene analysis.

5. The apparatus according to claim 1, wherein the processor is cooperative with the content projector for varying characteristics of the image responsively to an interaction between a user and the scene.

6. The apparatus according to claim 5, wherein the interaction comprises a variation in a gaze vector of the user toward the 3-dimensional object.

7. The apparatus according to claim 5, wherein the interaction comprises a gesture of the user relating to the 3-dimensional object.

8. The apparatus according to claim 5, wherein varying characteristics of the image comprises varying at least one of a scale and a compensation for distortion.

9. The apparatus according to claim 1, wherein the content projector is operative to establish the image as a virtual image in the wearable monitor.

10. The apparatus according to claim 1, wherein the sensing element, the processor and the content projector are incorporated in the wearable monitor.

11. The apparatus according to claim 1, wherein the image formed on the wearable monitor is a stereoscopic image.

12. A method for augmented interaction with a data processing system, comprising the steps of:
    capturing a 3-dimensional image of a scene;
    capturing a 2-dimensional image of the scene in registration with the 3-dimensional image;
    using a digital processor, processing the 3-dimensional image to locate a 3-dimensional object therein, and to determine that the 3-dimensional object satisfies predefined criteria;
    recognizing information relating to the 3-dimensional objects in the 2-dimensional image; and
    forming a content-containing image on a wearable monitor responsively to a location of the 3-dimensional object so that the image is superimposed on the 3-dimensional object in a 3-dimensional virtual space, while varying the content-containing image responsively to the recognized information.

13. The method according to claim 12, wherein forming the content-containing image comprises projecting the content-containing image onto see-through eyeglasses.

14. The method according to claim 12, further comprising the steps of varying characteristics of the content-containing image responsively to an interaction between a user and the scene.

15. The method according to claim 14, wherein the interaction comprises a variation in a gaze vector of the user toward one of the 3-dimensional objects.

16. The method according to claim 14, wherein the interaction comprises a gesture of the user relating to one of the 3-dimensional objects.

17. The method according to claim 12, wherein forming the content-containing image comprises establishing the image as a virtual image in the wearable monitor.

18. The method according to claim 12, wherein the 3-dimensional image is captured by a sensing element that is incorporated in the wearable monitor.

* * * * *